United States Patent [19]
Lee et al.

[11] Patent Number: 5,890,692
[45] Date of Patent: Apr. 6, 1999

[54] CUP HOLDER DEVICE

[75] Inventors: Bo Shin Lee, Seoul; Bong Heo, Kyunggi-do, both of Rep. of Korea

[73] Assignee: Sung Il Tech. Co., Ltd., Kyunggi-Do, Rep. of Korea

[21] Appl. No.: 909,956

[22] Filed: Aug. 12, 1997

[30] Foreign Application Priority Data

Dec. 30, 1996 [KR] Rep. of Korea ................. 1996-77031

[51] Int. Cl.$^6$ ..................................... A47K 1/08
[52] U.S. Cl. ..................... 248/311.2; 224/281; 224/926; 248/286.1
[58] Field of Search ................. 248/311.2, 146, 248/291.1, 292.13, 286.1; 224/281, 282, 483, 926; 297/188.17

[56] References Cited

U.S. PATENT DOCUMENTS

| | | | |
|---|---|---|---|
| 4,756,572 | 7/1988 | Dykstra et al. | 297/188.17 |
| 5,141,194 | 8/1992 | Burgess et al. | 248/311.2 |
| 5,171,061 | 12/1992 | Marcusen | 248/311.2 X |
| 5,248,183 | 9/1993 | Gignac et al. | 248/311.2 X |
| 5,259,580 | 11/1993 | Anderson et al. | 248/311.2 |
| 5,297,767 | 3/1994 | Miller et al. | 248/311.2 |
| 5,379,978 | 1/1995 | Patel et al. | 248/311.2 |
| 5,673,891 | 10/1997 | Fujihara et al. | 248/311.2 |
| 5,692,718 | 12/1997 | Bieck | 248/311.2 |

*Primary Examiner*—Derek J. Berger
*Attorney, Agent, or Firm*—Ladas & Parry

[57] ABSTRACT

A cup holder device capable of reducing the size of a cup holder body and enabling a tray to be drawn in and out from the body in a narrow space by folding the tray into two parts. The device includes a body having an opening formed on a front portion of the body, an inner tray for being drawn in and out of the body through the opening, an outer tray installed on a front portion of the inner tray so that both the inner tray and the outer tray provide at least one cup seat, and a hinge section for folding the outer tray over the inner tray so that the inner and outer trays in a folded state are received in the body.

7 Claims, 4 Drawing Sheets

CUP HOLDER DEVICE

BACKGROUND OF THE INVENTION

1. Field of the Invention

The present invention relates to a cup holder device, and more particularly to a cup holder device which can reduce the space occupied by the cup holder by collapsing a tray for supporting a cup into two parts when the tray is received in a body for safekeeping.

2. Description of the Prior Art

Generally, a cup holder device, as shown in FIG. 1, is installed in an automobile near a driver's seat, along with a cassette tape recorder, a radio, etc. The cup holder device is provided with a tray 1 which slides in and out of a body in the same manner as a drawer and which has a pair of cup seats 2 formed thereon, rail means for guiding the sliding movement of the tray 1, and locking means for locking/unlocking the rail means and the tray 1. In use, the tray 1 slides out from the body in an extended position as shown in FIG. 1, and cups or cans are put on the cup seats 2 formed on the upper portion of the tray 1.

However, one drawback of the conventional cup holder device is that its size is relatively large. Specifically, when the tray 1 is moved into the body in a retracted position for safekeeping, the body must be sufficiently deep to receive the full length of the tray in the extended position. Moreover, due to limited space in automobiles, the tray 1 may only have limited movement making it more difficult to use.

SUMMARY OF THE INVENTION

It is an object of the present invention to solve the problems involved in the prior art, and to provide a cup holder device having a reduced size body for receiving the tray while at the same time allowing the movement of the tray in the same manner as a drawer even in a narrow space by collapsing the tray for supporting the cup into two or more parts when the tray is received in the body for safekeeping.

To achieve the above object, there is provided a cup holder device having a body, inner and outer trays, and a hinge. The body has an entrance opening formed on a front portion. The inner tray moves in and out of the body through the opening. The outer tray is disposed on a front portion of the inner tray so that both the outer tray and the inner tray provide at least one cup seat. The hinge pivotally connects the two trays to allow folding of the outer tray over the inner tray so that the inner and outer trays in a folded state are received in the body.

BRIEF DESCRIPTION OF THE DRAWINGS

The above object, other features, and advantages of the present invention will become more apparent by describing the preferred embodiments thereof with reference to the accompanying drawings, in which.

DETAILED DESCRIPTION OF THE PREFERRED EMBODIMENTS

Figure 1:
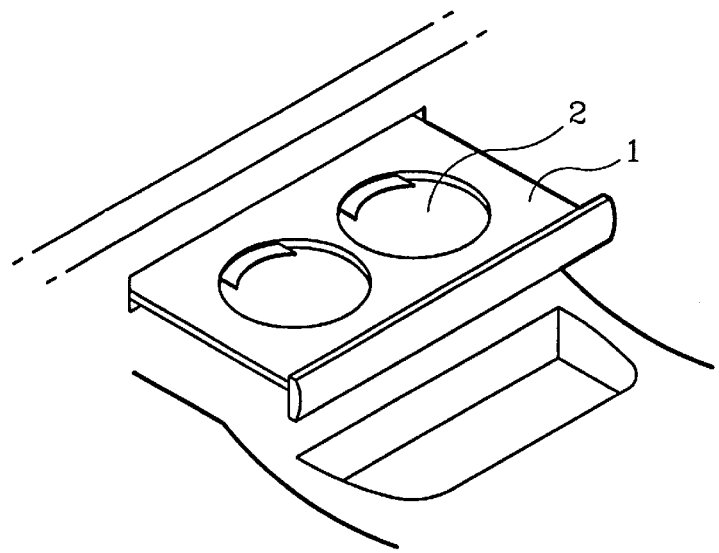
FIG. 1 is a perspective view of a conventional cup holder device.
Figure 2:
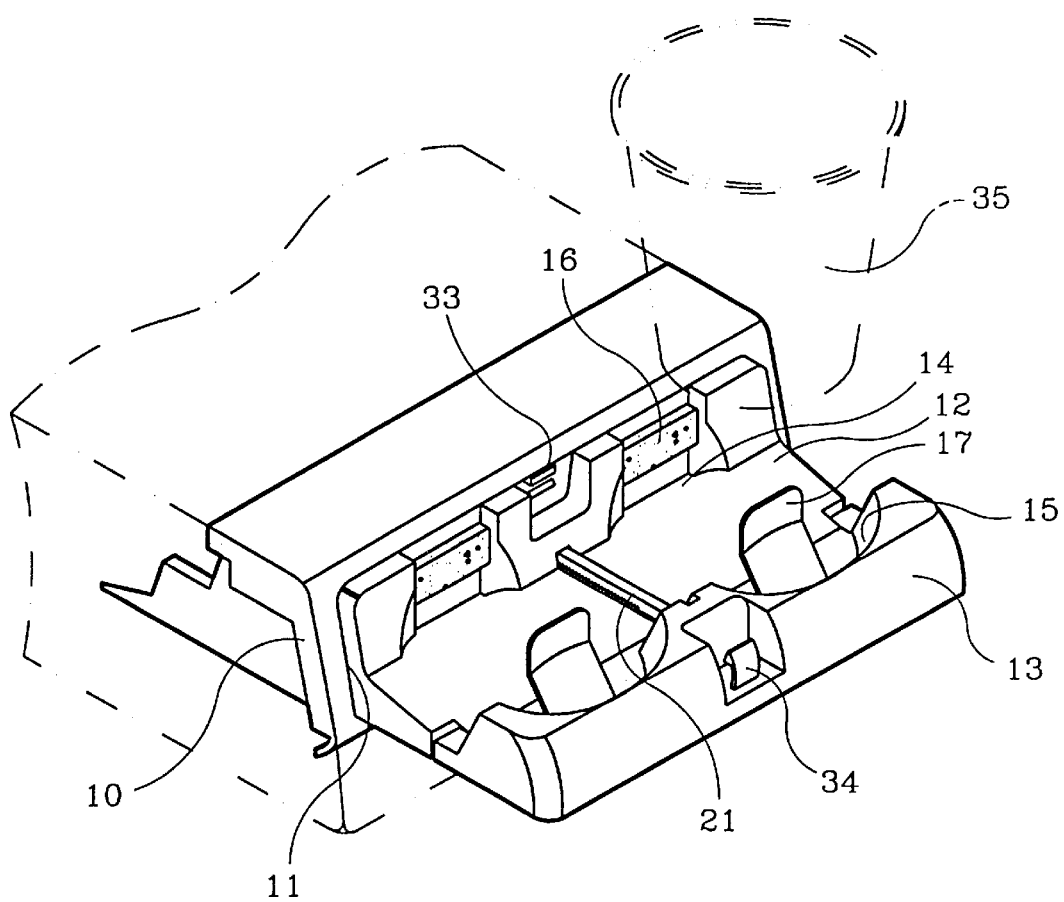
FIG. 2 is a perspective view of the cup holder device according to the present invention.
Figure 3:
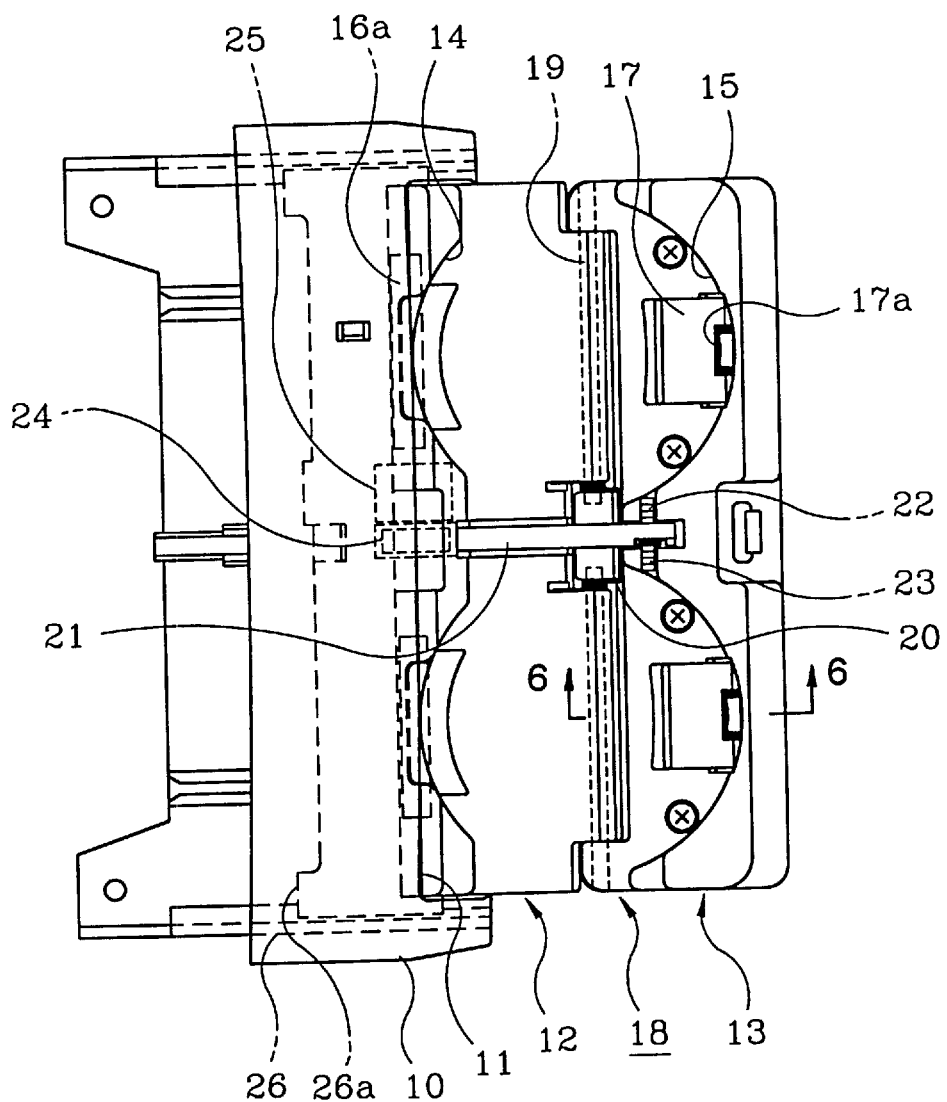
FIG. 3 is a plan view of the cup holder device according to the present invention in an open state.

FIG. 2 is a perspective view of the cup holder device according to the present invention, and FIG. 3 is a plan view of the cup holder device of FIG. 2 in an open state or extended position. Referring to FIGS. 2 and 3, an entrance opening 11 is formed on the front of a rectangular body 10, and an inner tray 12 is moved in and out of the body 10 through the opening 11. An outer tray 13 is provided on the front of the inner tray 12, so that when in use, a cup 35 is placed on a cup seat provided by both the inner and outer trays 12 and 13. When not in use, the inner and outer trays 12 and 13 are folded together by a hinge section 18, and are received in the body 10 in a folded state or retracted position. If the inner and outer trays are drawn out from the body 10, they are unfolded for use by a user. The hinge section 18 includes a hinge 19, installed between the inner and outer trays 12 and 13, for folding them together. An elastic member 20 is coupled to the hinge 19 so as to urge or force the outer tray 13 in the direction of the opening. Preferably, the elastic member 20 comprises a torsion spring.

Inner and outer cup seat portions 14 and 15 for supporting the lower periphery of the cup 35 are provided on the inner and outer trays 12 and 13, respectively. The inner and outer cup seat portions 14 and 15 as shown in FIGS. 2 and 3 have the shape of a circular arc which is equal to or longer than the periphery of the cup 35, and are provided with inner and outer pads 16 and 17, respectively, for pressing against the periphery of the cup 35 to securely retain the cup. The inner and outer pads 16 and 17 are always urged to press against the periphery of the cup 35 by springs 16a and 17a, respectively. A moving rack 21 is formed on the center of the outer tray 13 to extend across the inner tray 12, and a fixed pinion 24 is formed inside the inner tray 12 to be engaged with the moving rack 21. One end portion of the moving rack 21 is coupled to the outer tray 13 via a hinge 22, and the fixed pinion 24 is coupled to an oil damper 25 for reducing the rotating speed of the fixed pinion 24. Also, a spring 23 is installed in the hinge 22 to engage the moving rack 21 with the fixed pinion 24.

Figure 4:
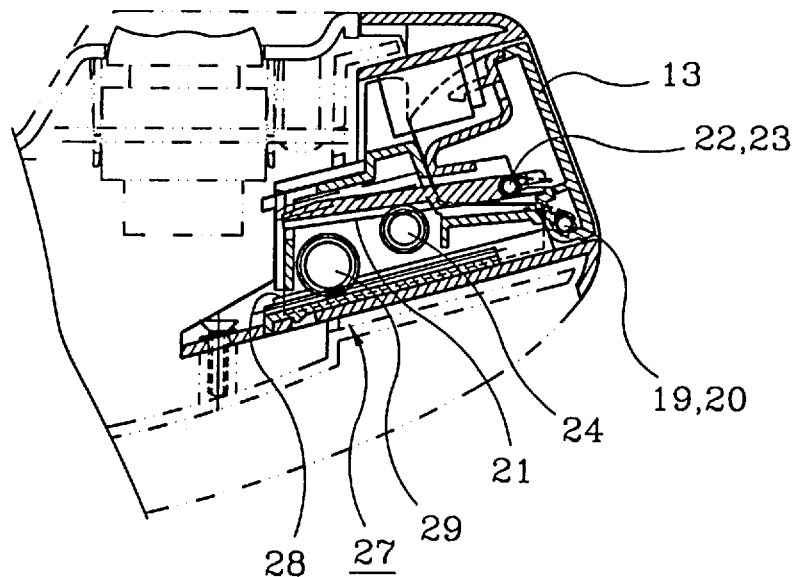
FIG. 4 is a side sectional view of the cup holder device according to the present invention in a closed state.
Figure 5:
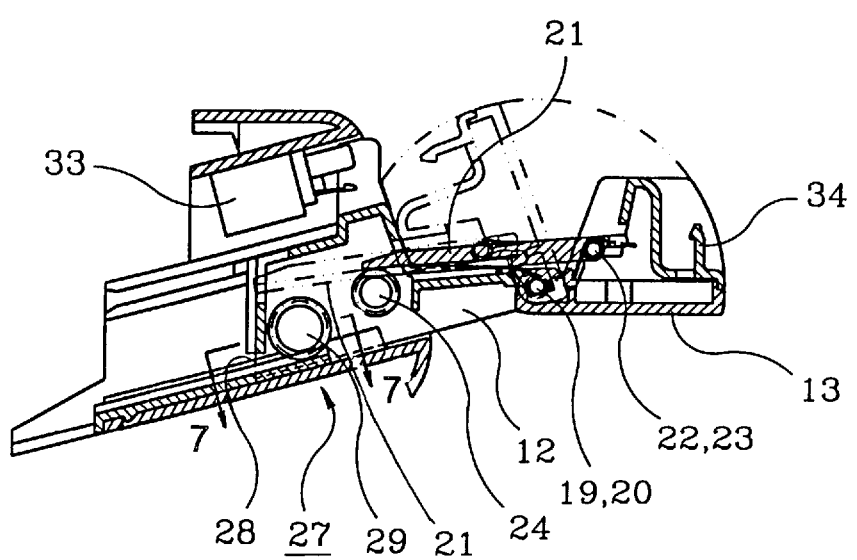
FIG. 5 is a side sectional view of the cup holder device according to the present invention in an open state.
Figure 6:
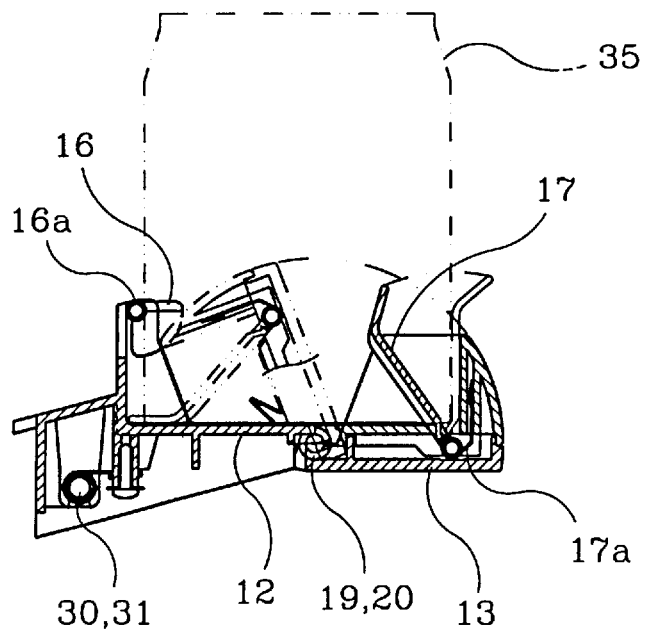
FIG. 6 is a sectional view taken along the line "A—A" of FIG. 3.

FIG. 4 is a side sectional view of the present cup holder device in a closed state, and FIG. 5 is a side sectional view of the present cup holder device in an open state. Referring to FIGS. 3 to 5, rails 26 are formed on both inner sides of the body 10, and rail carriers 26a are formed on both sides of the inner tray 12 so that the carriers 26a are placed on the rails 26 to be guided along the rails 26. A push switch 33 is provided on the upper inner surface of the opening 11 formed on the body 11, and a projection 34 for interlocking with or unlocking from the push switch 33 is formed on an opposite surface of the outer tray 13. Also, a damper section 27 is provided to enable the inner tray 12 which is received in the body 10 to be slowly drawn out from the body 10. The damper section 27 comprises a moving pinion 29 formed on the inner center of the inner tray 12, and a fixed rack 28 formed inside the body 10 that extends along the path of movement the moving pinion 29 and inner tray.

Figure 7:
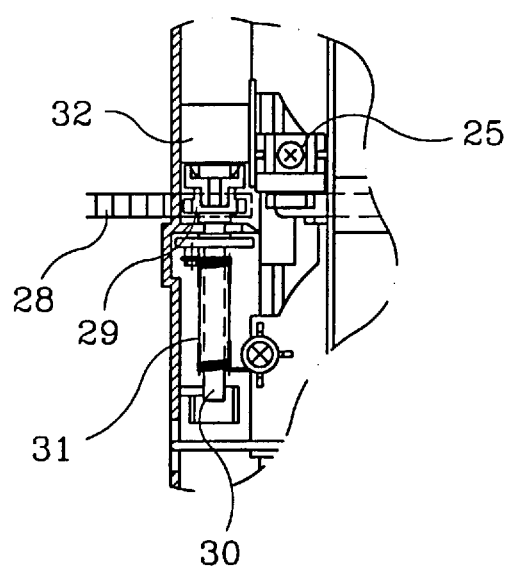
FIG. 7 is a sectional view taken along the line "B—B" of FIG. 5.

As shown in FIG. 7, the moving pinion 29 is engaged with one end portion of a driving shaft 30, and an elastic member 31, which preferably comprises a torsion spring, is provided on the periphery of the driving shaft 30. An oil damper 32 is coupled to the moving pinion 29 to reduce the rotating speed of the moving pinion 29. Specifically, the moving pinion 29 is rotated such that the inner tray 12 is received in the body 10, and thus the driving shaft 30, being interlocked with the moving pinion 29, is also rotated. At this time, the elastic member 31 provides a torsion force, so that the outer tray 13, being in a folded state, is locked with the body 10. Thereafter, if the outer tray 13 is unlocked and released from the inner tray 12, the driving shaft 30 is rotated by the restoring force of the elastic member 31. In this process, the moving pinion 29 is moved along the fixed rack 28 to move the inner tray 12, and the trays 12 and 13 are slowly and smoothly drawn out as the restoring force of the elastic member 31 is reduced by the oil damper 32.

According to the present invention as constructed above, the trays 12 and 13 are folded together when they are received in the body for safekeeping, and thereby the size of the cup holder is reduced. As shown in FIG. 4, when the tray is received in the body 10, the outer tray 13 pivots about the hinge 19 to be folded over the inner tray 12. At this time, if the projection 34 is locked with the push switch 33, the outer tray 13 is prevented from being unfolded by the restoring force of the elastic member 20. Also, when the inner tray 12 is received, the elastic member 31 is distorted to be in a compressed state and the restoring force of the elastic member 31 is maintained since the projection 34 is locked with the push switch 33.

If a user slightly pushes the front center portion of the outer tray 13 in order to use the trays, the inner and outer trays 12 and 13, as shown in FIG. 5, is drawn out from the body 10, and then unfolded. Specifically, if the outer tray 13 is pushed, the projection 34 is unlocked and released from the push switch 33, and simultaneously, the outer tray 13 pivots about hinge 19 to be opened by the restoring force of the elastic member 20. While the outer tray 13 is being opened, the moving rack 21 is engaged with the fixed pinion 24 to rotate the fixed pinion 24. At this time, the rotating force of the fixed pinion 24 is reduced by the oil damper 25, causing the moving rack 21 and the outer tray 13 coupled to the moving rack 21 to be opened slowly and smoothly.

Also, while the outer tray 13 is being opened, the inner tray 12 is drawn out from the body 10 by the restoring force of the elastic member 31. When the elastic member is restored, the driving shaft 30 is rotated by the torsion force thereof, and the moving pinion 29 coupled to the driving shaft 30 is moved along the fixed rack 28. Specifically, as the moving pinion 29 is moved along the fixed rack 28, the inner tray 12 is drawn out from the body 10 with its drawing speed mitigated by the oil damper 32. If the inner tray 12 is drawn out and the outer tray 13 is unfolded, the inner and outer cup seats 14 and 15 formed on the upper portions of the inner and outer trays 12 and 13 are exposed outside, so that the cup 35 can be placed on the cup seats 14 and 15. The movement of the cup 35 placed on the cup seats 14 and 15 is prohibited by the inner and outer pads 16 and 17 formed on the cup seats 14 and 15.

From the foregoing, according to the present cup holder device, the tray is composed of an inner tray for being drawn in and out of the body and an outer tray for being folded over the inner tray. Accordingly, the outer tray is received in the body, being folded over the inner tray, when not in use, thereby reducing the size of the body. Despite the reduced size body, the trays are drawn in and out in the same manner as a drawer. Further, reliability of the cup holder device is improved due to its smooth opening and closing motion, improving the reliability of the product.

While the present invention has been described and illustrated herein with reference to the preferred embodiments thereof, it will be understood by those skilled in the art that various changes in form and details may be made therein without departing from the spirit and scope of the invention.

What is claimed is:

1. A cup holder device comprising:

a body having an opening formed on a front of said body;

an inner tray for being drawn in and out of said body through said opening;

an outer tray provided on a front portion of said inner tray so that said inner and outer trays together provide at least one cup seat;

hinge means for folding said outer tray over said inner tray so that said inner and outer trays in a folded state are received in said body, said hinge means having a hinge on facing portions of said inner and outer trays for folding said outer tray over said inner tray, and an elastic member formed on said hinge, for forcing said outer tray in a direction where said outer tray is unfolded;

a moving rack formed on a center of said outer tray to extend to an inside of said inner tray and for pivoting said inner tray about said hinge;

a fixed pinion formed inside said inner tray and for engaging with said moving rack; and an oil damper coupled to said fixed pinion and for reducing a rotating speed of said fixed pinion.

2. A cup holder device as claimed in claim 1, further comprising:

inner and outer cup seat portions provided on said facing portions of said inner and outer trays, respectively, for supporting a bottom of a cup; and inner and outer pads provided on said inner and outer seat portions, respectively, for pressing against a periphery of said cup.

3. A cup holder device as claimed in claim 1, further comprising:

a fixed rack formed inside said body to extend along a path of movement of said inner tray;

a moving pinion, formed on a lower center of said inner tray, for engaging with said fixed rack, said moving pinion being rotated when said inner tray is moved; and an elastic member, positioned on a periphery of a driving shaft coupled to one end of said moving pinion, for storing a torsion force when said inner tray is received in said body.

4. A cup holder device as claimed in claim 3, further comprising an oil damper, coupled to one side of said moving pinion, for reducing rotating force of said driving shaft.

5. A cup holder device as claimed in claim 3, further comprising:

a push switch, formed on a front portion of said body, for performing a locking and unlocking operation; and a projection, formed on one side of said outer tray, for locking with and unlocking from said push switch, said projection maintaining said torsion force of said elastic member when said projection is locked with said push switch.

6. A cup holder device comprising:

a body having an opening on a front portion thereof;

a first dray;

a second tray pivotally connected to the first tray, the cup holder device having an extended position where the first and second trays are extended out of the body through the opening to receive at least one cup, and a retracted position where the first and second trays are folded and received in the body through the openings;

a hinge pivotally connecting the first and second trays to fold the second tray over the first tray;

a moving rack disposed in the second tray and extending into the first tray;

a fixed pinion disposed inside the first tray and that engages with the moving rack; and an oil damper coupled to the fixed pinion to reduce the rotating speed of the fixed pinion.

7. A cup holder device as claimed in claim 6, further comprising:

inner and outer cup seat portions respectively disposed on the first and second trays to support a bottom of the cup; and inner and outer pads respectively disposed on the inner and outer cup seat portions to press against a periphery of the cup.

* * * * *